(12) United States Patent
Banfield

(10) Patent No.: US 8,205,378 B2
(45) Date of Patent: Jun. 26, 2012

(54) TRAP FOR FLYING INSECTS

(75) Inventor: Michael Gilbert Banfield, Woodinville, CA (US)

(73) Assignee: SpringStar Inc., Woodinville, WA (US)

( * ) Notice: Subject to any disclaimer, the term of this patent is extended or adjusted under 35 U.S.C. 154(b) by 552 days.

(21) Appl. No.: 12/268,382

(22) Filed: Nov. 10, 2008

(65) Prior Publication Data

US 2009/0126257 A1     May 21, 2009

Related U.S. Application Data

(60) Provisional application No. 60/989,614, filed on Nov. 21, 2007.

(51) Int. Cl.
 *A01M 1/10* (2006.01)
(52) U.S. Cl. .......................... 43/122; 43/132.1
(58) Field of Classification Search ............ 43/107, 43/121, 122, 133, 132.1
 See application file for complete search history.

(56) References Cited

U.S. PATENT DOCUMENTS

| | | | |
|---|---|---|---|
| 1,085,388 A | 1/1914 | Overmyer | |
| 1,497,800 A | 1/1924 | Smith | |
| 1,900,199 A | 3/1933 | Pickett | |
| 1,924,379 A | 8/1933 | Reese | |
| 2,014,500 A | 9/1935 | Lass | |
| 2,478,104 A | 8/1949 | Johnson | |
| 3,885,341 A * | 5/1975 | Kuchenbecker et al. | 43/65 |
| 4,244,135 A | 1/1981 | Harwoods | |
| 4,551,941 A | 11/1985 | Schneidmiller | |
| 4,638,592 A * | 1/1987 | Schneidmiller | 43/122 |
| 4,794,724 A | 1/1989 | Peters | |
| 5,231,791 A | 8/1993 | Falkson | |
| 5,231,792 A | 8/1993 | Warner | |
| 5,392,560 A * | 2/1995 | Donahue et al. | 43/122 |
| 5,461,822 A | 10/1995 | Green | |
| 5,522,171 A | 6/1996 | Mandeville | |
| D371,418 S | 7/1996 | Rubel | |
| 5,557,880 A | 9/1996 | Schneidmiller | |
| 5,596,833 A | 1/1997 | Harrie | |
| 5,987,809 A | 11/1999 | Cehok | |
| 6,393,760 B1 | 5/2002 | Lingren | |
| 6,505,435 B2 | 1/2003 | Chrestman | |
| 6,532,695 B1 | 3/2003 | Alvarado | |
| 6,625,922 B1 | 9/2003 | Ernsberger | |
| 6,626,325 B1 | 9/2003 | Humphrey | |

(Continued)

FOREIGN PATENT DOCUMENTS

CH         116301     * 8/1926

OTHER PUBLICATIONS http://www.merriam-webster.com/dictionary/orifice.*

*Primary Examiner* — Joshua J Michener
(74) *Attorney, Agent, or Firm* — Jeffrey Schox

(57) ABSTRACT

In the preferred embodiment, the invention is a trap for luring, trapping, and killing insects. The trap preferably includes: a single structure container defining a cavity that holds liquid, an opening that allows access to the cavity, a side wall, and a lid that seals the opening of the container. The side wall includes an orifice in the form of a frusto-conical shape that allows ingress of insects into the container and prevents egress of insects from the container. The side wall also includes a landing surface that directs insect towards the orifice.

21 Claims, 6 Drawing Sheets

U.S. PATENT DOCUMENTS

| | | |
|---|---|---|
| 6,637,149 B1 | 10/2003 | Bauer |
| 6,722,080 B2 | 4/2004 | Carter |
| 6,910,298 B2 | 6/2005 | Schneidmiller |
| 7,082,712 B2 | 8/2006 | Harris |
| 2004/0231228 A1 | 11/2004 | Pazik |
| 2005/0235554 A1 | 10/2005 | Uhl |
| 2006/0042154 A1 | 3/2006 | Rich |
| 2006/0137240 A1 | 6/2006 | Dismore |

* cited by examiner

TRAP FOR FLYING INSECTS

CROSS-REFERENCE TO RELATED APPLICATIONS

This application claims the benefit of U.S. Provisional Application No. 60/989,614, filed on 21 Nov. 2007, which is incorporated in its entirety by this reference.

TECHNICAL FIELD

This invention relates generally to the insect-capture field, and more specifically to an improved trap for insects and similar subjects.

BACKGROUND

The prolific population of undesirable insects and other similar subjects is a significant problem in most areas of the world. Insects such as mosquitoes and flies carry diseases that may be spread to humans with devastating effects. The ability to effectively capture undesirable insects and similar subjects may be a significant advantage in fighting the spread of disease. In regions where diseases such as malaria or west Nile virus are rampant, this ability will vastly facilitate health promotion efforts. In regions where such diseases are not as common, this ability will prevent attacks on humans and other animals by such insects. Currently available traps involve multiple parts and are costly to manufacture. In addition, currently available traps are not able to efficiently attract, trap, and kill an adequate number of insects and similar subjects, thus resulting in scenarios that necessitate additional traps or have inadequate protection against insects and similar subjects.

Thus, there is a need in the insect-capture field to create an improved trap for insects and similar subjects. This invention provides such improved trap.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
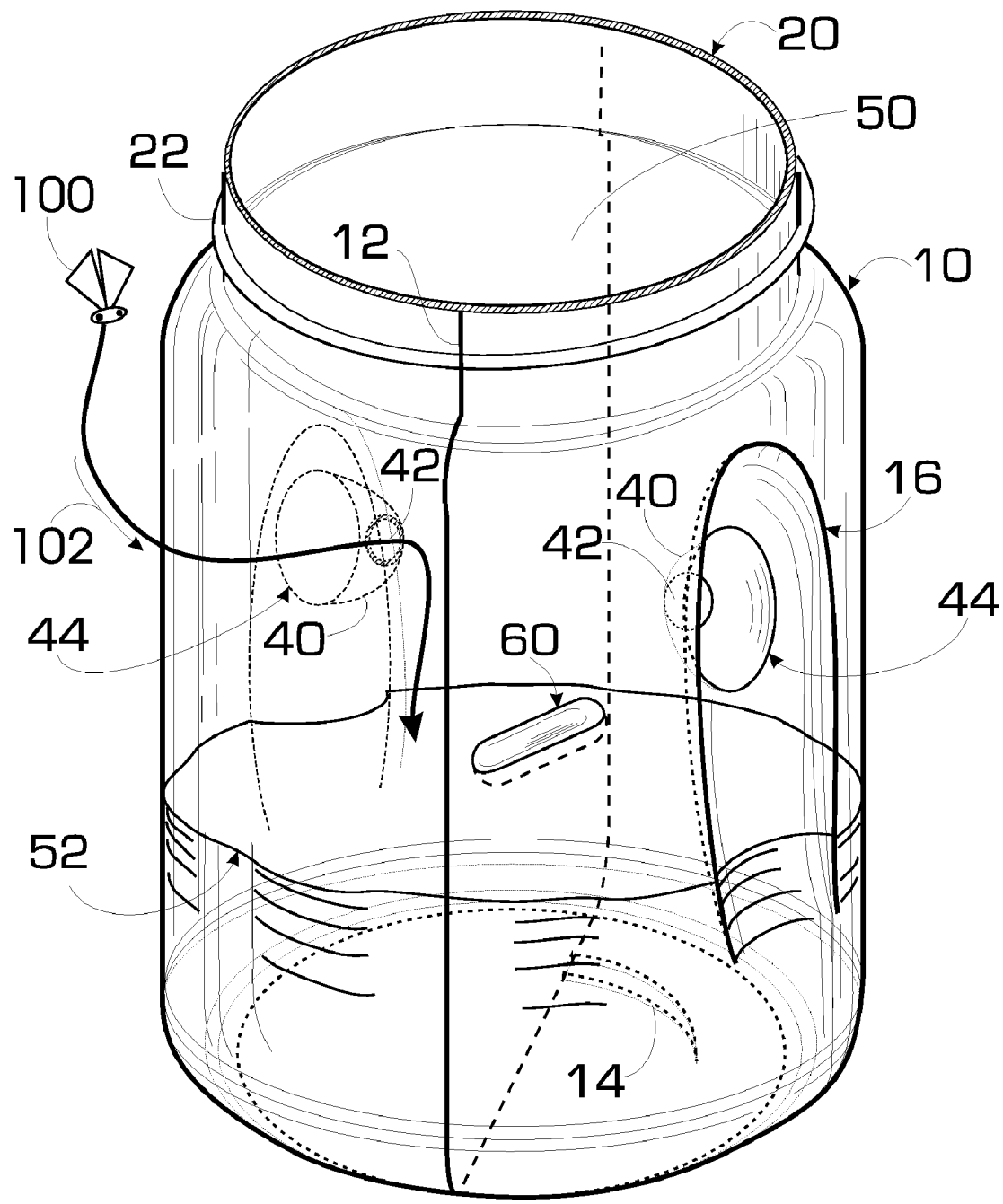
FIG. 1 is an upper perspective view of a preferred embodiment of the invention while in use with the lid removed.
Figure 2:
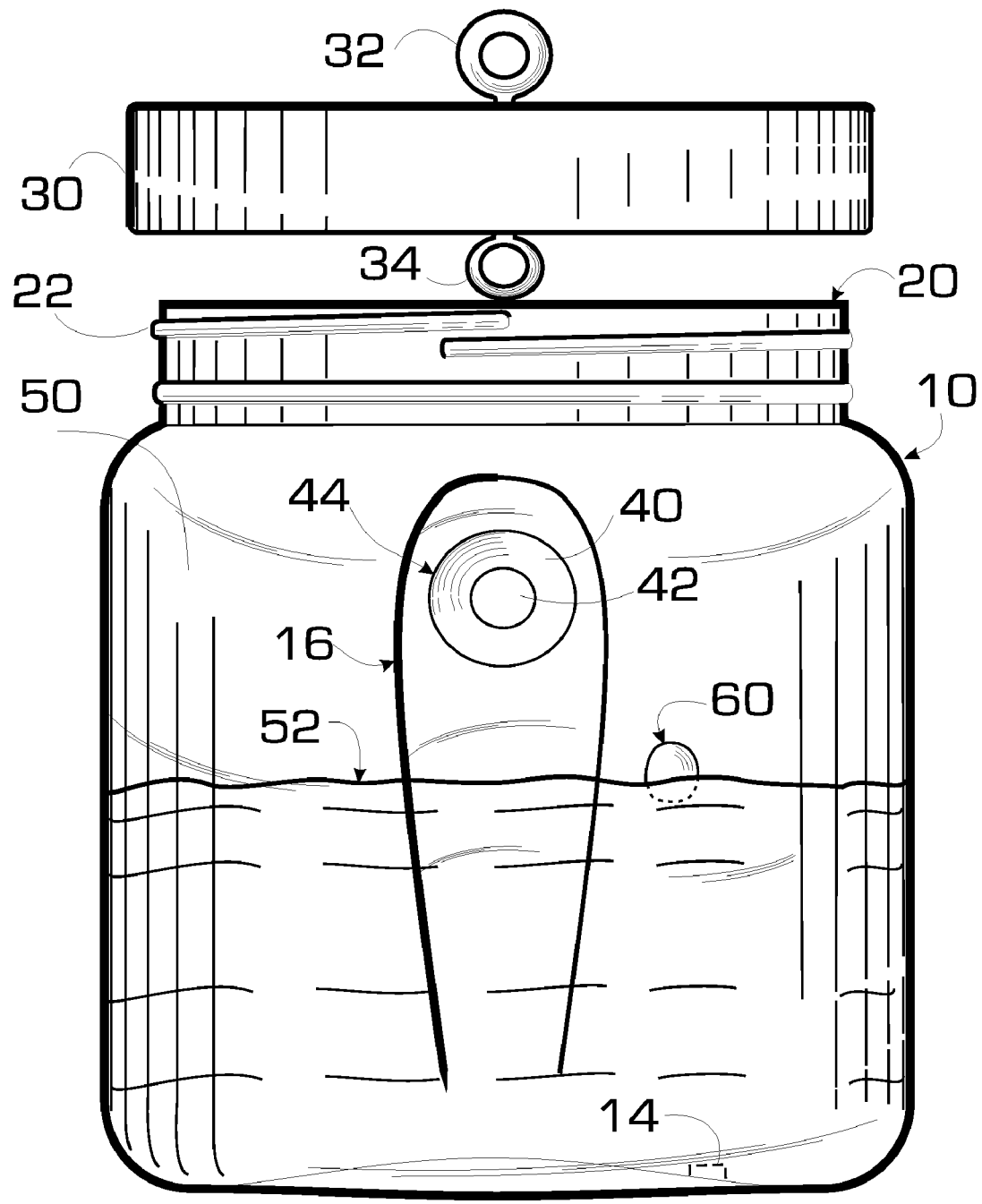
FIG. 2 is a side view of the preferred embodiment of FIG. 1 with the lid detached.
Figure 3:
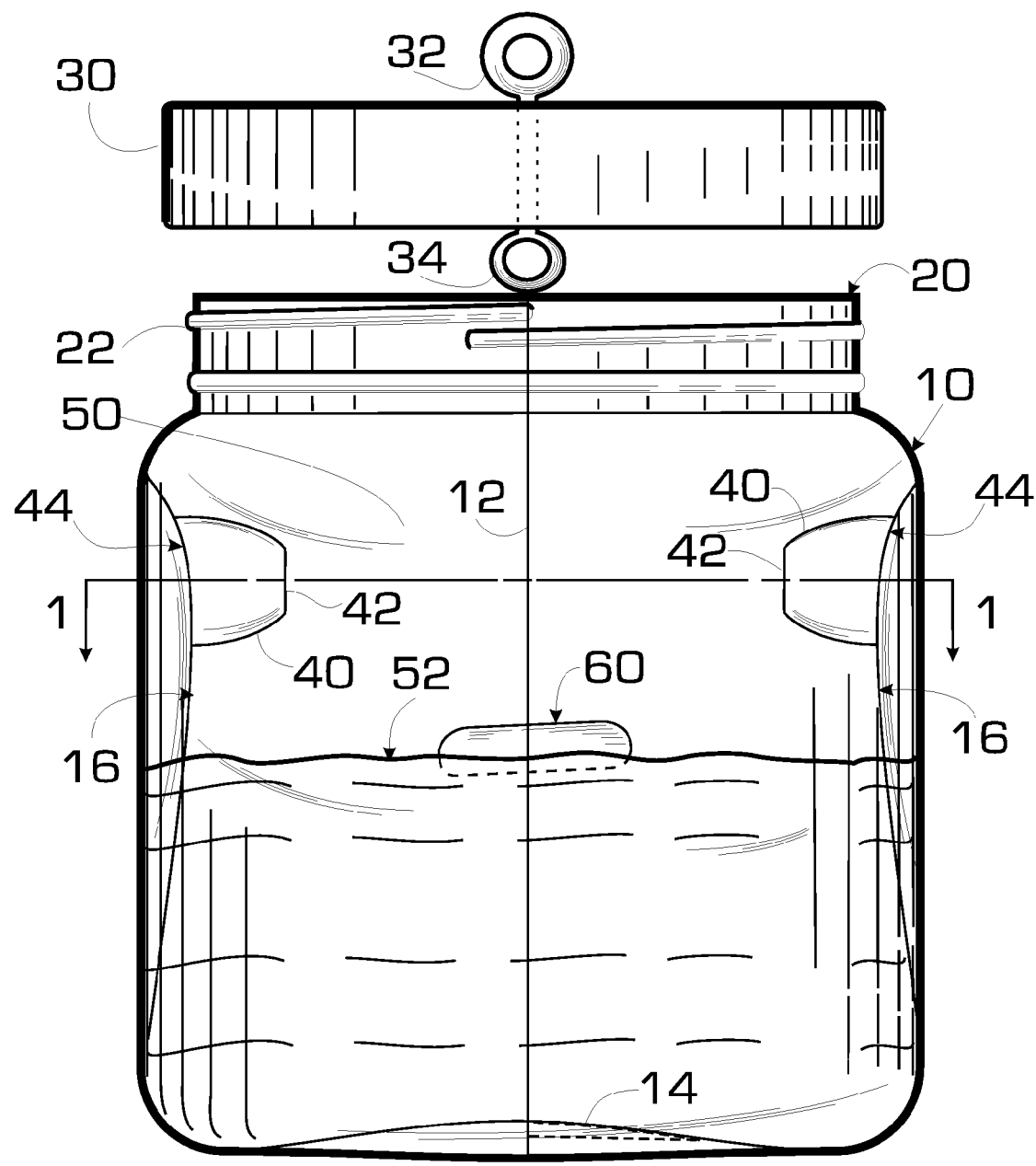
FIG. 3 is a side view of the preferred embodiment of FIG. 1 oriented 90 degrees from FIG. 2.
Figure 4:
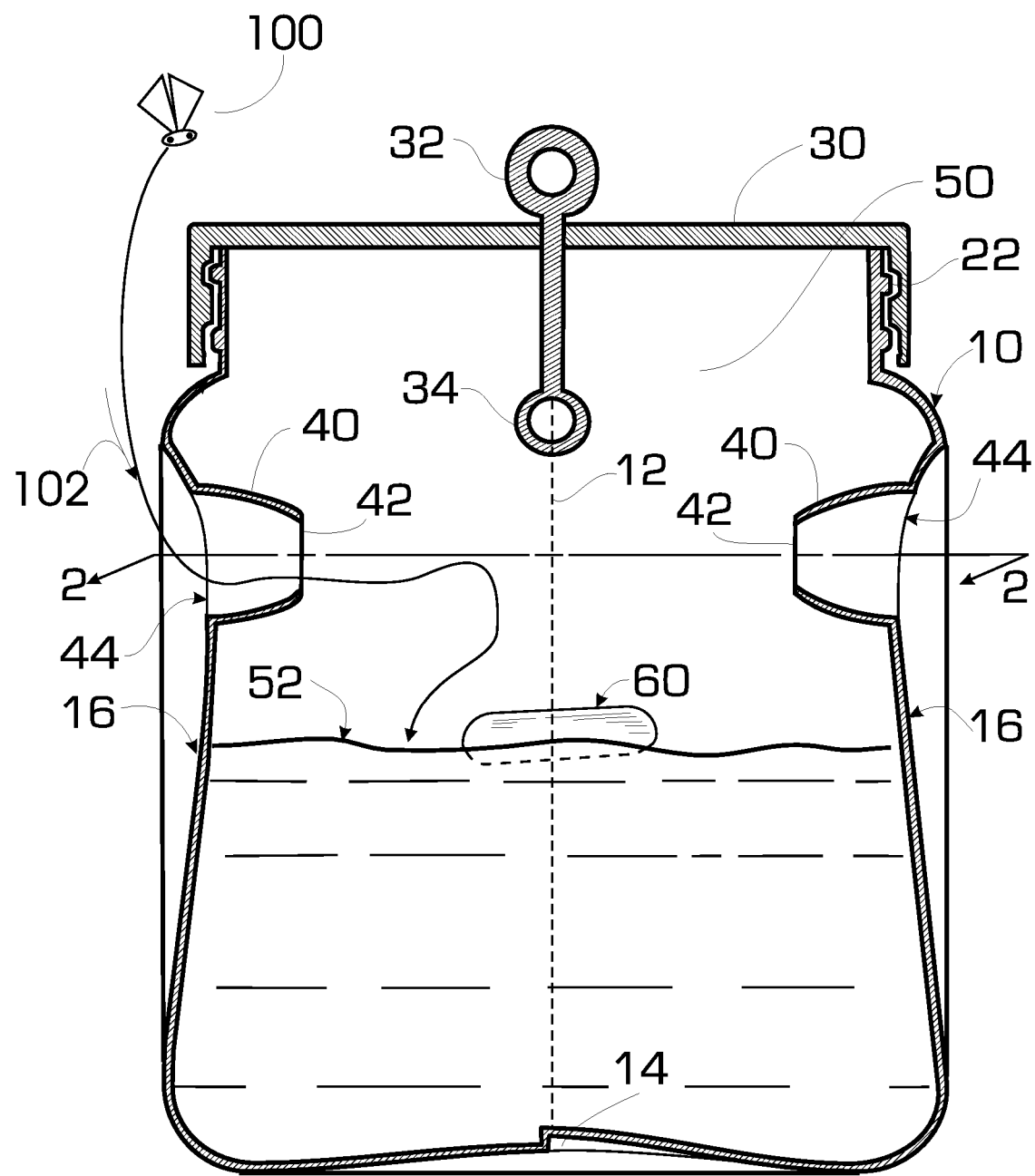
FIG. 4 is a cross-sectional view of the preferred embodiment of FIG. 1 taken along the line 1-1 of FIG. 3.

As shown in FIGS. 1 and 2, the preferred embodiment of the invention includes a container 10 and a lid 30. The container is a single structure and includes a cavity 50, a main opening 20, and a side wall with a frusto-conical orifice 40 for insects and similar subjects and a landing surface for insects 16. The lid 30 functions to seal the main opening of the container. This two part construction for the preferred embodiment is simple and easy to use. Such traps are likely to be used in a variety of scenarios including where insects and similar subjects 100 (hereafter referred to as insects) are likely to spread disease and where insects and similar subjects are a nuisance to humans and other animals.

The container 10 functions as the baiting, trapping, and killing chamber for the trap. Insects and similar subjects are attracted into the container, trapped inside the container, and—because they cannot escape the container—finally killed inside the container. The container defines a cavity 50 that may be used to hold a baiting liquid 52 such as juice. Alternatively, baiting liquid 52 may be sugar water, honey, or any other suitable liquid detectable and attractive to the targeted insects. The baiting liquid 52 may also include insect exterminating additives. Once the cavity 50 is filled with an adequate volume of baiting liquid 52 through the main opening 20, the container is sealed with lid 30 and placed in the area where the capture of insects 100 is desired. When in use, an insect 100 is attracted by the baiting liquid 52 and preferably follows the path 102 through the orifice 40 into the cavity 50 of the container 10. The insect 100 may also be attracted to the light transmitted through the walls of the container 10 and may not be able to navigate itself to the orifice 40 to attempt egression. Extermination of insect 100 may be due to exhaustion followed by drowning within baiting liquid 52 or may also be exterminated by any exterminating additives within the container 10. The container 30 can be emptied of both the baiting liquid 52 and the captured insects 100 after use or after a certain length of time. If continued use of the trap is desired, the internal cavity 50 can be filled with new baiting fluid 52 and the trap may be used again.

The container 10 is preferably of a general cylindrical shape, but may alternatively be square or any other suitable geometric shape. The container is preferably sized to accommodate the targeted insect 100. The volume of the interior cavity 50 is preferably of the following:

0.5 liter to 4 liters for flies and wasps;
1 liter to 4 liters for large moths (for example, gypsy moths); or
0.1 liter to 0.5 liter for small insects (for example, microlepidoptera).

However, any other volume suitable to the capture of insects 100 may be used.

The main opening 20 allows the user to easily access the internal cavity 50 of the container 10 to clean the container 10 after use and to add new baiting liquid 52. The main opening 20 interfaces with the lid 30. The main opening 20 preferably includes threads 22 to interface with the lid 30. The threads 22 function to securely fasten the lid 30 to the container 10 while providing a reliable seal of the container 10. The threads 22 are preferably of a Society of Plastic Industry Standard, such as SPI 110/440 size. where the diameter, height, and thread-count are determined by the Standard. Alternatively, the main opening 20 may include tracks for a bayonet fitting with the lid 30, snaps that engage the lid 30, grooves that mate with grooves on the lid 30, or a groove to accommodate a rubber band that holds down lid 30. However, any other suitable engagement mechanism with the lid 30 may be used. The container 10 may also include one or more inferior, external grooves 14 supra that can function to physically index the container 10 during silk-screening, capping or other processes to be applied to the invention insect trap.

The frusto-conical orifice 40 of the preferred embodiment functions to allow the ingress of insects 100 into the container 10 while preventing the egress of insects 100 from the container 10. The frusto-conical orifice 40 defines two holes: a smaller inner hole 42 that opens into the cavity and a larger outer hole 44 that blends into the side wall. The frusto-conical orifice 40 also preferably extends into interior cavity 50 in the horizontal direction. This provides advantages in flexibility in usage scenarios for the invention. Because the frusto-conical orifice 40 is not placed on the underside of the container 10 and does not extend into the interior cavity 50 in the vertical direction, the invention may be placed on a flat surface without the need for risers or support feet to prevent obstruction of such an orifice. The horizontal extension of the frusto-conical orifice 40 also allows for maximum orifice 40 exposure to insects 100 in any usage scenario. The outer hole 44 is preferably of a diameter large enough to encourage insects 100 to approach the inner hole 42. The detection of baiting liquid 52 encourages the insect 100 to enter the container 10 through the inner hole 42. The inner hole 42 is preferably of a diameter large enough to allow the insect to ingress the container 10, but small enough to discourage the egress of the insect from the container. The position of the inner hole 42 within the interior cavity 50 is preferably at a location that insects 100 may only fly to in order to access. Thus, the inner hole 42 is preferably sized equal to or smaller than the insect 100 at open wingspan to prevent a flying approach. The inner hole 42 may also be any other size suitable to preventing the insect 100 from flying through. The wall of the interior cavity 50 at the frusto-conical orifice 40 is preferably smooth (and "slippery") and difficult for the insect 100 to grip and crawl on, which also discourages the insect 100 from traversing the wall along the frusto-conical orifice 40 to reach the inner hole 42. In the event the insect 100 reaches the inner hole 42 by crawling along the wall, the insect must then perform a 180-degree turn to egress through inner hole 42, which also discourages the insect 100 from escaping the container 10. The open wingspan of undesirable insects 100 such as flies, wasps, and moths typically exceed 1.0 cm. Thus, the diameter of the inner hole 42 is preferably 1 cm. The diameter of the outer hole 44 is preferably 2.5 cm to allow insects 100 to comfortably enter the frusto-conical shape and proceed to the inner hole 42 for capture. Alternatively, any other diameters suitable for encouraging insect 100 ingress and discouraging insect 100 egress may be used. The extension of the frusto-conical shape of the orifice 40 into the inner cavity 50 is preferably short enough to maintain the attention of the insect 100 as it is approaching inner hole 42 and long enough to discourage egression of the insect 100 from the container 10. The frusto-conical shape of the orifice 40 preferably extends into the inner cavity by 2.0 cm. Alternatively, any other extension suitable to facilitating the capture of insects 100. To increase opportunity for insect 100 to enter the container 10, multiple frusto-conical orifices 40 may be included into the container 10, as shown in FIGS. 1, 3, 4, 5, and 6. A second frusto-conical orifice 40 is preferably oriented at 180 degrees from the first frusto-conical orifice 40. This facilitates manufacturing of container 10 and broadens the angles at which an insect 100 may approach the container 10 and be captured.

The landing surface 16 of the preferred embodiment functions to facilitate the approach of insects towards the frusto-conical orifice 40. The outer hole 42 of the frusto-conical orifice 40 is preferably contained within the boundaries of the landing surface 16 such that the frusto-conical orifice 40 extends into the internal cavity 50 from the landing surface 16. This encourages insects 100 that land onto the landing surface 16 to proceed towards the frusto-conical orifice 40. The landing surface 16 is preferably textured to assist the insects 100 to grip onto the landing surface 16. The landing surface 16 is also preferably depressed (or "recessed") into the internal cavity 50, further directing insects 100 towards the frusto-conical orifice 40. The recessed landing surface 16 preferably allows the frusto-conical orifice 40 to extend further into the internal cavity 50 while maintaining the distance between the inner hole 42 and the outer hole 44. This results in the inner hole 42 to be closer to the center of the internal cavity 50, creating additional difficulty for insects 100 in attempting to egress the container 10.

Figure 5:
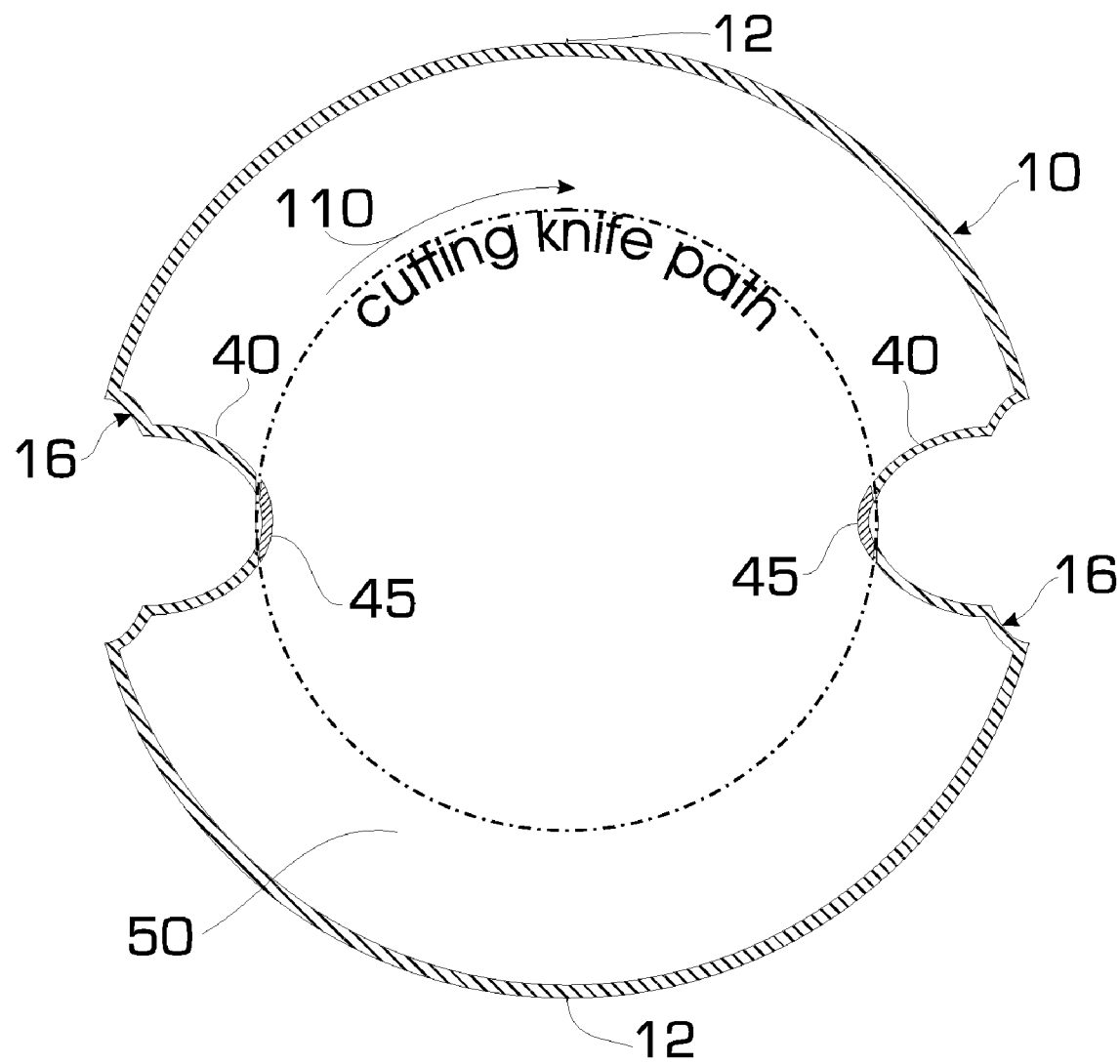
FIG. 5 is a cross-sectional view of the preferred embodiment of FIG. 1 taken along the line 2-2 of FIG. 4.
Figure 6:
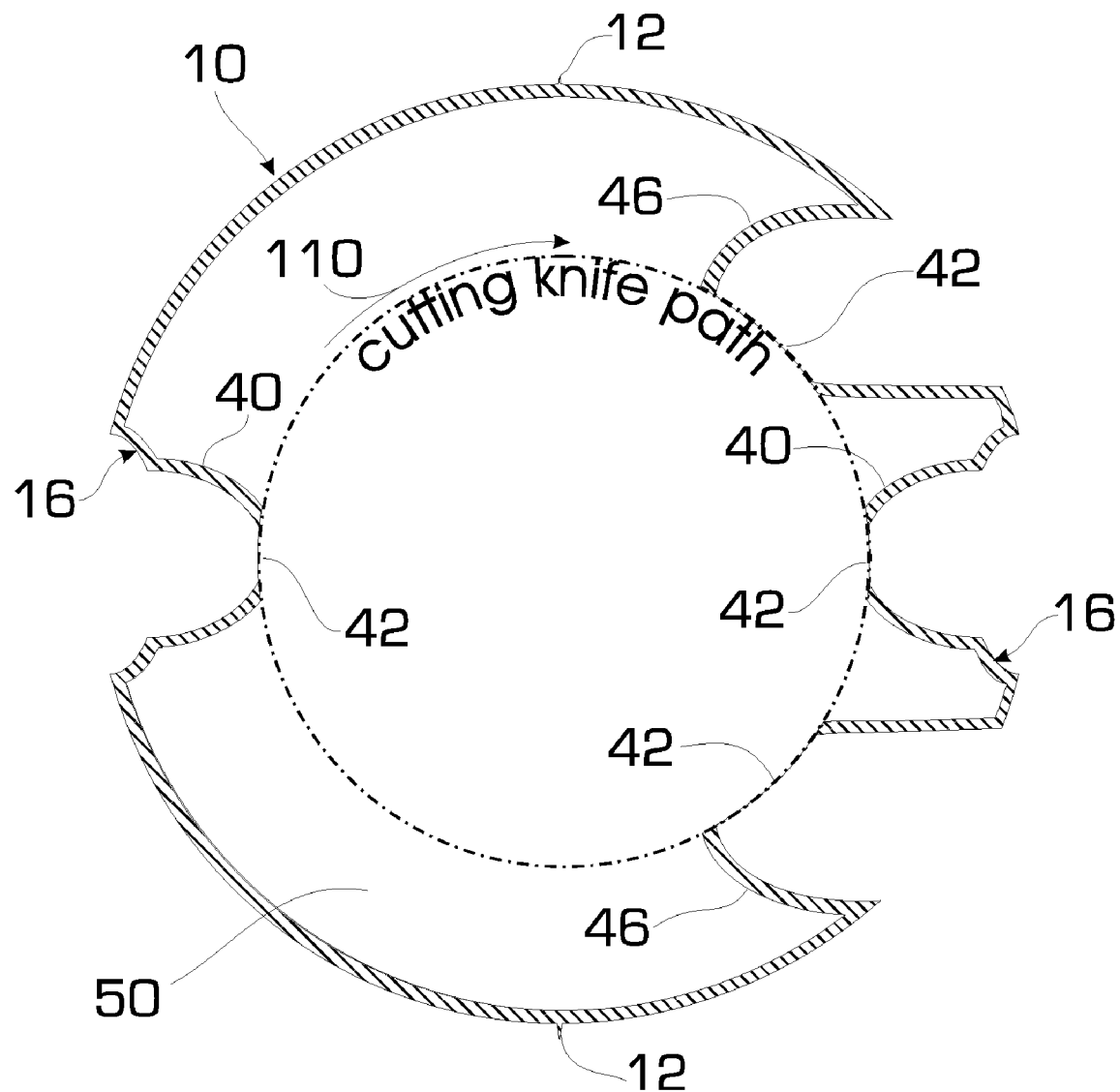
FIG. 6 is a cross-sectional view, similar to the view of FIG. 4, except showing a variation of the preferred embodiment.

The container 10 is preferably manufactured using a standard blow-molding process, whereby a high-temperature process forms a hollow distended slug of molten polymer that is placed into a pair of diametrically-opposite metal die halves that are internally-formed with the dimensional shape of the exterior of the container 10 and all features of container 10 (including, for example, the frusto-conical orifice 40 and threads 22). Air forced under high pressure internally to the molten polymeric slug forces it to stretch to a thin, continuous film, said film assuming the three-dimensional shape and features of the container 10. The inner hole 42 of the frusto-conical orifice 40 is, however, not yet formed. The main opening 20 also remains sealed by the standard blow-mold process. The interface where the two die halves meet during processing contains a small gap, which creates an externally-formed parting line 12 on the outside of the container 10. The dies are preferably water-cooled, and the thin polymer film freezes to the shape within the dies. In one version of the manufacturing method, the die halves are preferably physically opened in opposite directions and at a distance sufficient to allow the frusto-concial forms of the die to be free of the container 10 during the de-molding step. The frusto-conical orifice 40 formed in the wall of the container 10 is preferably formed at go degrees from the parting line 12 to allow a two-part die to be sufficient for de-molding. Other angles for the frusto-conical orifice 40 may result in the die to contain additional components to withdraw the frusto-conical orifice 40 from the mold cavity by use of pneumatics, motors, slides, or other method. If additional frusto-conical orifices 46 are desired, the additional orifices 46 are preferably placed directly above or below, but radially distant, from the frusto-conical orifices 40 and are preferably similarly go degrees from the parting line 12 and asymmetrical in form as shown by asymmetrical frusto-conical orifices 46 in FIG. 6. After de-molding by the standard process, the container 10 is preferably placed into a spinning knife system that removes the remnant anterior slug artifact, thus opening the main opening 20 the container 10. The spinning knives can further enter the interior cavity 50 and trace a path 110 as shown in FIGS. 5 and 6 that removes the proximal tips 45 from the frusto-conical entrances 40, thus creating the inner hole 42. Where the path of the spinning knives impinge on asymmetrical frusto-conical orifices 46, as shown in FIG. 6, the entrance hole 42 of assymetrical frusto-conical orifices 46 will also be asymmetrical. The final finish step is considered a standard operation of the blow-mold process of manufacturing articles.

In an alternative blow-mold process, instead of initially creating a loosely-formed hollow slug of plastic, the heated polymer may be forced into metal dies such as those used for standard plastic injection molding, thus precisely creating a pre-form comprised of main opening 20 and threads 22. In yet another alternative, one or more frusto-conical orifices 40 that do not require a secondary process to form inner hole 42 in the incipient container 10 may be simultaneously created. The still-heated preform is preferably physically transferred to another set of die halves and air, forced under high pressure, is applied internally to the pre-form, thereby inflating the polymer to form the final container 10. The cooled object ejected from the terminal process is the completely formed invention insect trap with no additional processing.

The container 10 is preferably manufactured from any of the standard polymers used in the blow-molding process, for example, high density polyethylene, low density polyethylene, polypropylene, poly vinyl chloride, polyethylene, polycarbonate, acrylonitrile copolymer (i.e. Barex®), or polyethylene terephthalate. The container 10 may be clear or may be tinted in a color, ultraviolet or infrared die, pigment, additive or enhancer that is attractive to insects. Alternatively, the container 10 may be of any suitable material, of any suitable color, and may contain any suitable additive for luring insects.

The lid 30 of the preferred embodiment functions to seal the main opening 20 of the container 10. The lid 30 is preferably removable and reusable and includes threads to interface with the threads 22 of the main opening 20. The threads 22 of the lid 30 are preferably of a Society of Plastic Industry Standard where the diameter, height, and thread-count are determined by the Standard. The threads 22 of lid 30 function to securely fasten the lid 30 to the container 10 while providing a reliable seal of the container 10. Alternatively, the lid 30 may include pegs to interface with a bayonet mechanism on the main opening 20, grooves to interface with snaps on the main opening 20, or posts to interface with grooves on the main opening 20. The lid 30 is also preferably made of a plastic or any other moldable material suitable for injection molding. The lid 30 may alternatively be a pliable material that is secured to the main opening 20 with a fastening mechanism such as an elastic band. In this variation, the lid 30 may be a disposable material, recyclable paper material, or a plastic sheet.

The lid 30 may also include a hole to accommodate a hanging element 32. The hanging element 32 functions to allow the invention to be hung in a location desired by the user, which provides additional flexibility in the usage scenarios for the invention. The hanging element 32 is preferably a twist-tie, but may be a solid hook or any other suitable device or method to allow the invention to be hung. The hanging element 32 also includes a stopping element 34 that functions to prevent hanging element 32 from disengaging from the hole in the lid 30.

The preferred embodiment may also include one or more controlled-release dispensers 60. The controlled-release dispenser 60 functions to hold an attractant for insects 100. The controlled-release dispenser 60 includes an attractant release cap that functions to prevent or slow the release attractant until the user desires to release the attractant, for example, when the invention is to be put into use. The attractant for insects 100 may include bait, lure, pheromone, semiochemical, or any other substance suitable to attract insects 100. The controlled-release dispenser 60 is also adapted to float in baiting liquid 52 during use of the invention. The controlled-release dispenser 60 may alternatively be attached to stopping element 34 to hang above the baiting liquid 52. In this variation, the controlled-release dispenser 60 may also function as the stopping element 34. However, multiple controlled-release dispensers 60 may be concurrently included into the invention, for example, one to float in baiting liquid 52 and a second controlled-release dispenser 60 to be attached to (or to be used as) the stopping element 34. This creates several layers of attractant within the container 10, creating a stronger attraction for insects 100 to the container 10 and facilitating the capture of insects 100.

The preferred embodiment is described in reference to the trapping of flying insects 100 such as wasps, flies, moths, and mosquitoes. However, this invention is also applicable to a wide variety of other pest insects, both flying and crawling.

As a person skilled in the art will recognize from the previous detailed description and from the figures and claims, modifications and changes can be made to the preferred embodiments of the invention without departing from the scope of this invention defined in the following claims.

I claim:

1. A trap, for insects, comprising:
   a single unitary-structure polymer container including a bottom, a side wall, and an opening:
   wherein the bottom and the side wall define a cavity configured to hold a liquid;
   wherein the opening allows access to the cavity;
   wherein the sidewall defines a landing surface recessed toward the cavity;
   wherein the side wall further defines a frusto-conical recess arranged on the landing surface and terminating in an orifice configured to allow ingress of an insect into the cavity;
   wherein the landing surface is configured to direct the insect toward the frusto-conical recess;
   wherein the landing surface has a recessed depth less than a recessed depth of said frusto-conical recess; and
   a lid configured to close the opening of the container.

2. The trap of claim 1, wherein the side wall of the container further defines a first thread proximal to the opening, and wherein the lid defines a second thread configured to mate with the first thread.

3. The trap of claim 2, wherein the first and second threads are Society of Plastic Industry Standard size 100/440.

4. The trap of claim 1, wherein the frusto-conical recess includes a base, opposite the orifice, with a diameter of 2.5 cm, and wherein the orifice is 1 cm in diameter.

5. The trap of claim 4, wherein the frusto-conical recess extends into the container by 2 cm.

6. The trap of claim 1, wherein the frusto-conical recess includes an interior side facing the cavity, and wherein the interior side defines a smooth surface configured to deter the insect from escaping the container through the orifice.

7. The trap of claim 1, wherein the side wall defines a second frusto-conical recess terminating in a second orifice configured to allow ingress of the insect into the cavity.

8. The trap of claim 1, wherein the landing surface includes a rough exterior surface configured to assist movement of the insect toward the frusto-conical recess.

9. The trap of claim 1, wherein the cavity of the container has a volume within the range of 0.5 Liter and 4 Liters, and wherein the insect is selected from the group consisting of moths, wasps, and flies.

10. The trap of claim 1, wherein the cavity of the container has a volume within the range of 0.1 Liter and 0.5 Liter, and wherein the insect is a mosquito.

11. The trap of claim 1, wherein the container is constructed of a blow-molded plastic that includes a tint selected from the group consisting of color tints, ultraviolet tints, and infrared tints.

12. The trap of claim 1, wherein the lid defines a through-hole.

13. The trap of claim 12, further comprising a hanging element arranged on the interior-side of the lid, wherein the hanging element is retained by a fastener, passing through the through-hole, and a stop, on the interior-side of the lid.

14. The trap of claim 13, wherein the hanging element comprises a controlled-release dispenser.

15. The trap of claim 14, wherein the controlled-release dispenser acts as the stop.

16. The trap of claim 1, further comprising a controlled-release dispenser configured to float in the liquid, wherein the controlled-release dispenser contains an attractant for the insect.

17. The trap of claim 16, wherein the attractant is selected from the group consisting of bait, a lure, a pheromone, and a semiochemical.

18. The trap of claim 1, wherein the container is generally cylindrical.

19. The trap of claim 1, wherein the container defines a single exterior parting line that is a result of manufacture by molding with a mold consisting of two mold halves.

20. A trap, for insects, comprising:
   a unitary-structure polymer container including a bottom, a side wall, and an opening:
      wherein the bottom and the side wall define a cavity configured to hold a liquid;
      wherein the opening is configured to allow access to the cavity;
      wherein the side wall defines a landing surface recessed toward the cavity;
      wherein the side wall further defines a frusto-conical shape recess arranged on the landing surface, including a 2.5 cm-diameter base, and terminating in a 1 cm-diameter orifice configured to allow ingress of an insect into the cavity;
      wherein the landing surface has a recessed depth less than a recessed depth of said frusto-conical recess;
      wherein the landing surface includes a rough exterior surface configured to assist movement of the insect toward the frusto-conical recess;
      wherein the frusto-conical recess includes an interior side, adjacent to the cavity, that defines a surface substantially smoother than the rough exterior surface of the landing surface; and
   a lid configured to close the opening of the container.

21. A trap, for insects, comprising:
   a unitary-structure polymer container including a bottom, a side wall, and an opening:
      wherein the bottom and the side wall define a cavity configured to hold a liquid;
      wherein the opening is configured to allow access to the cavity;
      wherein the side wall defines a landing surface recessed toward the cavity;
      wherein the side wall further defines a frusto-conical recess arranged on the landing surface and terminating in an orifice configured to allow ingress of an insect into the cavity;
      wherein the landing surface has a recessed depth less than a recessed depth of said frusto-conical recess;
      wherein the landing surface includes a rough exterior surface configured to assist movement of the insect toward the frusto-conical recess;
      wherein the frusto-conical recess includes an interior side, adjacent to the cavity, that defines a surface substantially smoother than the rough exterior surface of the landing surface;
      wherein the container defines a single exterior parting line that is a result of manufacture by molding with a mold consisting of two mold halves; and
lid configured to close the opening of the container.

* * * * *